United States Patent Office 3,314,519
Patented Apr. 18, 1967

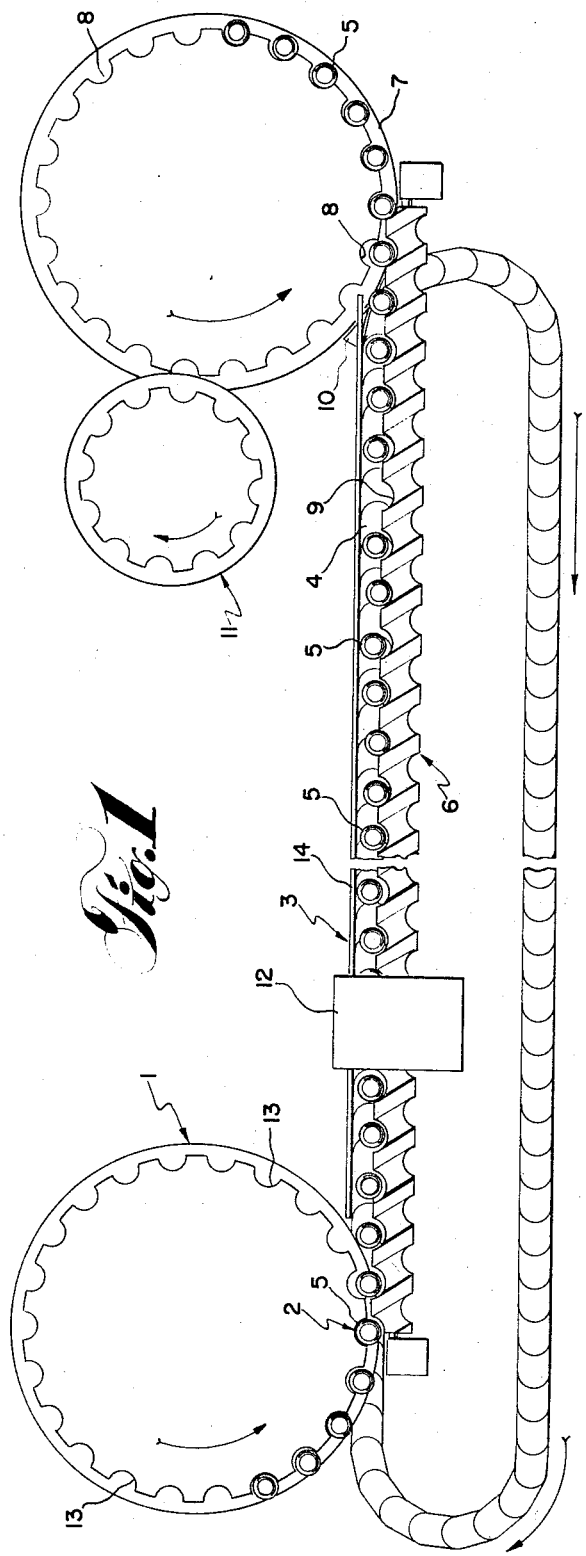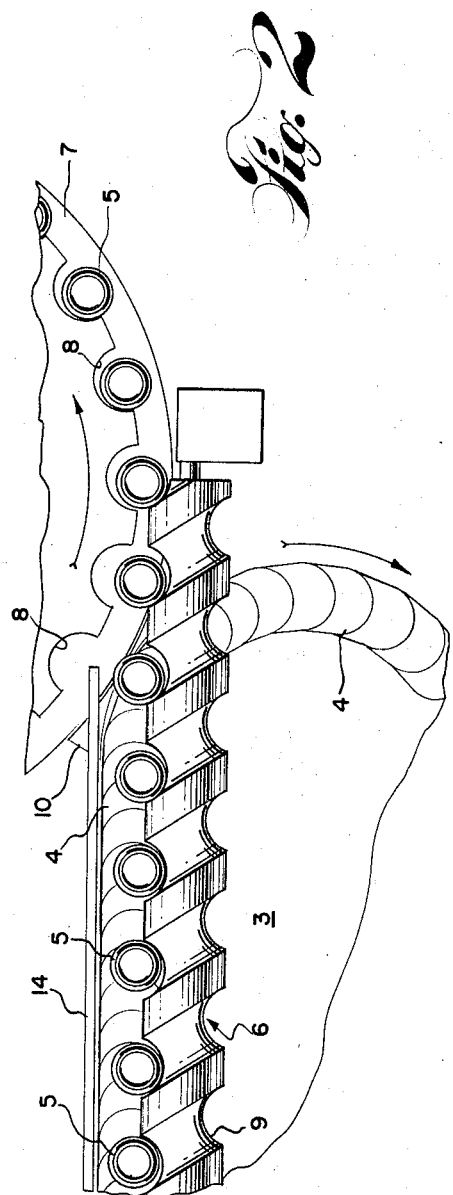
INVENTOR.
Frank M. Kelly
BY
Frederick A. Weidner, Jr.
ATTORNEY

3,314,519
CONTAINER TRANSFER
Frank M. Kelly, Richmond, Ind., assignor to Aluminum Company of America, Pittsburgh, Pa., a corporation of Pennsylvania
Filed Apr. 14, 1965, Ser. No. 448,009
3 Claims. (Cl. 198—22)

This invention relates to transferring containers, such as bottles, from one location to another. In particular this invention relates to transferring product-filled containers from a linear moving conveyor to a rotational machine. This invention is of utility particularly when used in connection with or as forming a part of a machine for filling and capping containers such as bottles or jars.

Apparatus of the type in which this invention is particularly useful may include a multi-station rotating filler which fills empty containers with a desired product, a horizontal conveyor table that receives the filled containers from the filler and then transfers the filled containers linearly into a rotary capping machine, and a capping machine which then applies the closures by conventional well-known means.

It is desirable to employ relatively high speeds for transferring filled containers; however, one of the most troublesome areas in high speed transfer systems is spillage of the product due to vibration or changes in speed of the containers that causes some of the product to spill or splash out of the containers. Product spillage is troublesome in high speed transfer systems as it detrimentally affects the transfer and capping apparatus; the product often spills onto the threaded glass finish so that, after the closure is applied and the consumer attempts to open the container, the dried product increases the opening torque necessary to release the closure from the container.

It is an object of this invention to provide for transferring filled containers with a minimum of product spillage from such containers during transfer.

It is another object of this invention to provide for transferring filled containers from a linear moving conveyor to a rotary capper with a minimum of change in speed or vibration of the containers.

It is another object of this invention to provide for high speed transfer, in the same horizontal plane, of product-filled containers from a linear moving conveyor to container receiving pockets in a rotating capper, with a minimum of change in speed or vibration, thereby preventing splashing of the product outside the containers.

The invention in respect of the foregoing and other features and advantages will be understood from a consideration of the detailed description which follows, taken in conjunction with the accompanying drawings wherein:

FIG. 1 is a schematic plan view of the apparatus for transferring filled containers from the filler to the rotating capper, and FIG. 2 is an enlarged schematic view of a transfer area that is of particular concern in the employment of this invention.

With reference to FIG. 1 there is provided a multi-head rotational filling machine 1 that is illustrated as rotating counterclockwise. As is customary, empty containers, such as bottles or jars, are introduced into the filler and are rotated for some distance while the desired product is introduced into the container. At a predetermined discharge position 2 the filled containers 5 are removed from the rotating filler 1 and placed upon a horizontal conveyor table 3, with a continuous moving horizontal conveyor 4 that has a flat-faced upper surface to provide a conveying surface upon which the bottom of the containers rest. The conveyor 4 may be a flat-faced, link chain horizontally articulated conveyor that provides a smooth upper surface even as the conveyor is articulated so as to turn tangentially to the capper hereinafter referred to. The speed of the moving conveyor 4 can be adjusted or regulated.

In conjunction with the conveyor 4 there is a screw drive 6 with a continuous thread having a uniform pitch and with a groove 9 that helps to convey the containers 5 at a predetermined speed and also spaces the moving containers correctly. Groove 9 has a curvature slightly greater than that of the containers 5. A guide rail 14 keeps the containers positioned properly along the linear conveyor path. The link chain conveyor 4 and the screw drive 6 are regulated so that they advance the containers at a uniform speed. At a position along the linear path, the containers pass under a closure feeding station 12 that places a loose closure on each of the filled containers 5. When the containers approach the end of the conveyor table 3, they are transferred to the rotating multi-head capper 7. It is in this area of transfer that a minimum of change in speed or vibration of the containers is particularly difficult to achieve. Heretofore, the common method of transferring filled containers to a rotating capper was to feed the containers into an intake star wheel that would be rotated counterclockwise in the arrangement shown in FIG. 1 and then into a clockwise rotating capper. During such a transfer, however, there is necessarily a change in directional movement of the containers which, during high speed operation, splashes or spills product out of the containers. In this invention, I maintain the linear directional movement of the containers until they are in the container receiving pockets 8 in the rotating capper 7 where the closures may be tightly pressed down on and/or affixed to the filled containers before any change in directional movement can cause spillage. After the closures are affixed as by a thread rolling operation, the containers are removed from the capper by a take-off star wheel 11. In accordance with the invention, the containers are transferred from the linear conveyor table 3 to the rotating capper 7 in the same horizontal plane and in a straight line with a minimum of vibration or change in speed. Although only a few representative containers 5 are shown in the drawings, it is to be understood that during operation of the equipment substantially all of the groove 9 positions, and capper receiving pockets 8 up to the take-off star wheel 11, have a container positioned therein.

With reference to FIG. 2, particularly, it will be noted that the screw drive 6 has a continuous uniform pitch and the curvature of the groove 9 of the screw drive is slightly larger than that of the containers 5 received therein. In the case of bottles or jars, particularly, it is well known that the glass finish varies from one container to another. This occurrence is referred to commonly as "minimum and maximum glass," and the outside diameter of the bottles will usually vary between minimum and maximum glass by about $\frac{1}{16}$ inch. For screw drives to accommodate bottles properly they must have the curvature of groove 9 large enough to receive maximum dimensional glass and, in addition thereto, must also provide some small amount of clearance between the glass and the inside of the receiving groove. The bottles therefore, have a "sloppy" fit when they are in the groove 9 of the screw. Those bottles which have minimum dimensional outside diameters have even more of a "sloppy" fit. Although this invention is particularly useful in connection with transferring glass bottles, it nevertheless is beneficial in connection with transferring other type containers, such as metal cans and plastic containers, where spillage of product during transfer is concerned. During high speed transfer and capping operations, this "play" or clearance between the filled containers 5 and screw drive groove 9 introduces a change or variance in speed of the filled containers 5 during the transfer from the linear conveyor table 3 to the rotating capper 7 that induces the product to spill or splash out of the container.

To overcome this undesirable variance in filled container speed, the containers 5 are seated in the groove 9 of the screw drive 6 so that they all are in the rear portion of the groove in each of the respective positions as they move into the capper 7. The capper receiving pockets 8, which also must have about the same degree of clearance for the containers as the screw drive groove, are annularly rotated in the same general direction and at a pitch speed the same as the speed the containers 5 are moving along the linear conveyor table 3. The rotating capper 7 can be regulated or adjusted so that the filled containers 5 from the rear of the screw drive groove 9 are received in the rear of the receiving pockets 8 of the rotating capper 7. With such precise transfer the filled containers are not jostled or vibrated and do not make any change in directional movement until they are in the capper. Shortly after the filled containers 5 are in the capper 7 the closures are clamped down tight on the containers and affixed to the containers in a conventional manner. Thereafter, of course, there would be no spillage problem.

To accomplish seating or positioning the containers 5 in their proper position in the rear of the curvature of the screw drive groove 9, the movement of the bottom of the containers is retarded slightly when the containers are transferred from the linear conveyor table 3 to the rotating capper 7. Although the transfer surfaces, including articulated portions of conveyor 4 and the dead plate 10, are lubricated to reduce frictional resistance to the containers, there nevertheless is enough retardation of the containers to seat or position them in the rear portion of the curvature of the screw drive groove 9. This retardation in speed must be very gradual as otherwise spillage of product would be induced. By the particular arrangement of my transfer equipment the desired slight retardation of the filled containers is accomplished. However, the containers are driven at a positive constant speed, once the containers are seated in the rear portion of the screw drive groove 9.

The conveyor table 3 is arranged so that during the transfer from the continuous linear moving conveyor 4 to the rotating capper 7 the conveyor 4 is horizontally articulated about vertical axes tangentially to the capper, and passes under the screw drive 6. This arrangement positions the containers 5 snug against the screw drive groove 9. The small dead plate 10 area over which the containers pass is kept to a minimum, as the containers will travel more smoothly on surfaces that are moving at about the same speed as the containers are being moved or driven by the screw drive 6.

The description in specific detail of the selected practice of the invention will suggest to those skilled in the art various changes, substitutions and other departures from any disclosure within the spirit and scope of the appended claims.

What is claimed is:

1. The method of transferring filled containers from a linear conveyor to receiving pockets in a rotary capper so as to prevent spillage of the product from the filled containers, said method comprising conveying filled containers in a lineal direction, at uniform spacings, at a selected constant speed, on a linear moving conveyor, maintaining substantially uniform spacing of said containers by use of a screw drive having a continuous thread and uniform pitch with the groove of the screw having slightly larger curvature than the containers, regulating said conveyor and screw drive to move the containers linearly at a constant speed, transferring the containers from said conveyor to receiving pockets in a horizontal rotating capper while maintaining linear directional movement of the containers by means of the screw drive and applying transverse force to the containers in the direction of the screw drive, said capper being rotated at a pitch speed the same as the speed of the containers moving along the linear conveyor, and positioning the containers during said transfer in the rear portion of the groove of the screw drive so that the containers are in position for registration with the rotary capper receiving pockets.

2. Apparatus for transferring filled containers from a linear conveyor to receiving pockets in a rotary capper so as to prevent spillage of the product from the filled containers, said apparatus comprising means for conveying filled containers in a lineal direction and at a selected constant speed, means for uniformly spacing and transferring the containers at said selected constant speed in a straight line from said conveyor means to receiving pockets in a rotating capper comprising a screw drive with a continuous thread and uniform pitch and a groove, said groove having a curvature slightly larger than the containers, means for applying transverse force to the containers in the direction of the screw drive during the transfer operation, and means for positioning the containers during said transfer in the rear portion of the groove curvature of the screw drive so that the containers are in position for registration with the rotary capper receiving pockets.

3. Apparatus for transferring filled containers from a lineal conveyor to receiving pockets in a rotary capper so as to prevent spillage of the product from the filled containers, said apparatus comprising means for conveying filled containers in a lineal direction and at a selected constant speed, said means being horizontally articulated to turn tangentially to the rotary capper as it approaches the same, means for uniformly spacing and transferring the containers at said selected constant speed in a straight line from said conveyor means to receiving pockets in a rotating capper comprising a screw drive with a continuous thread and uniform pitch and a groove, said groove having a curavture slightly larger than the containers, and means for positioning the containers during said transfer in the rear portion of the groove curvature of the screw drive so that the containers are in position for registration with the rotary capper receiving pockets.

References Cited by the Examiner

UNITED STATES PATENTS

| 2,837,127 | 6/1958 | Luther | 198—34 X |
| 2,857,037 | 10/1958 | Breeback. | |

FOREIGN PATENTS 890,026   9/1953   Germany.

EVON C. BLUNK, *Primary Examiner.*

SAMUEL F. COLEMAN, *Examiner.*

E. A. SROKA, *Assistant Examiner.*